Patented Aug. 6, 1940

2,210,837

UNITED STATES PATENT OFFICE 2,210,837

ALPHA-BETA - UNSATURATED ALIPHATIC AMINES AND PROCESS FOR MAKING THEM

Daniel Kästner, Krefeld-Uerdingen, Germany, assignor to I. G. Farbenindustrie Aktiengesellschaft, Frankfort-on-the-Main, Germany No Drawing. Application June 22, 1938, Serial No. 215,213. In Germany June 23, 1937

12 Claims. (Cl. 260—583)

This invention relates to a process for the manufacture of $\alpha,\beta$-unsaturated amines.

In accordance with the present invention $\alpha,\beta$-unsaturated ketones which contain a chain with more than 8 carbon atoms are converted in a technically simple manner into $\alpha,\beta$-unsaturated amines with a chain of more than 8 carbon atoms. The process of manufacture according to the invention consists in heating the said ketones with formamide and decomposing the formyl compounds produced by means of acids in the manner known per se, for example by means of hydrochloric acid, sulfuric acid, phosphoric acid and so on.

Among the ketones suitable for the present process may be mentioned heptenyl methyl ketone, methyl cyclohexenyl methyl ketone, diisobutenyl methyl ketone, nonenyl methyl ketone, dodecenyl ethyl ketone, pentadecenyl propyl ketone, octadecenyl methyl ketone and so on. It is to be mentioned that the ketones with open chain are especially suitable for the purpose of this invention.

The reaction is suitably carried out with the application of excess of formamide.

The temperature during the reaction may vary according to the conditions. I have obtained good results at temperatures over about 100° C. and especially at temperatures from about 150 to about 200° C., the upper limit for the temperature being only given by the decomposition point of the components of the reaction mixture and by the resistivity of the construction material.

The ketones mentioned above may be obtained, for example, by heating a solution of an olefine in an acid anhydride in the presence of a suitable catalyst to elevated temperatures, in particular to temperatures above 50° C. and especially to temperatures exceeding 80° C., if desired under pressure. At these temperatures the higher olefines are likewise soluble in the acid anhydrides and accordingly enter into smooth reaction.

Among the acid anhydrides suitable for the manufacture of the ketones may be mentioned acetic anhydride, propionic acid anhydride and the mixed anhydride of formic acid and acetic acid.

As examples of the olefine reaction components may be especially mentioned olefines containing at least 6 carbon atoms, such as for example hexylene, alkylated hexylenes, such as methyl hexylene, ethyl hexylene and isopropyl hexylene, diisobutylene and particularly also the nonylenes, dodecylenes, pentadecylenes and octadecylenes.

Substances which may be employed as catalysts are, for example, zinc chloride and sulfuric acid and also the compounds obtainable from boron fluoride containing at least one hydrogen atom, capable of dissociating, such as for example compounds of boron fluoride with water, and acids. Among those compounds of boron fluoride may be particularly mentioned boron fluoride dihydrate and boron fluoride diacetate, as described in the paper by H. Meerwein in Journal für Praktische Chemie, vol. 141, Nos. 5–8, pages 123 and following.

The separation of the acid formed by the reaction and of the unreacted acid anhydride from the reaction mixture can be carried out in the known manner, such as for example by washing out with water and subsequent treatment with caustic soda lye or by distillation especially under diminished pressure. The separation of the unsaturated ketone from the unchanged olefine is with advantage accomplished by fractional distillation, if desired under reduced pressure. In this manner the unreacted starting materials are practically completely recovered: as above mentioned the formation of considerable amounts of bye products does not take place.

The amines obtainable according to this invention may be used, for example, in the form of their salts with acids, such as hydrochloric acid as wetting agents in the manner known in the art.

The invention is illustrated but not restricted by the following examples: the parts are by weight:

Example 1

50 parts by weight of boron fluoride diacetic acid are introduced drop by drop at 80° C. into a mixture of 150 parts by weight of isomeric diisobutylenes and 160 parts by weight of acetic anhydride. Stirring is then continued for a further 2 hours at this temperature. Working up to the reaction mixture yields 90 parts by weight of a colorless liquid, boiling at 75–85° C. under a pressure of 10 mms. mercury gauge and having the odor of caraway oil. A molecular weight determination on this product gave a value of 146, while for a compound of the composition $C_{10}H_{18}O$ a molecular weight of 154 is calculated.

Elementary analysis yielded the following values:

$C = 77.7\%$
$H = 12.05\%$ calculated for $C_{10}H_{18}O$ $C = 78.0\%$
$H = 11.7\%$ Accordingly this product is a mixture of isomeric diisobutenyl methyl ketones.

770 parts by weight of these diisobutenyl methyl ketones and 900 parts by weight of formamide are heated to boiling under reflux for 18 hours with stirring. The temperature during this operation is maintained at 185° C. The reaction takes place with the evolution of ammonia and carbon dioxide. On working up the reaction product 385 parts by weight are obtained of a fraction boiling at 157–175° C. under 13 mms. mercury gauge, the composition and properties of which correspond to a formyl isodecenyl amine or a mixture of isomers. The residue consists of higher boiling amides.

By saponification with concentrated hydrochloric acid at 110° C. the corresponding isodecenyl amine is obtained. It is a colorless liquid boiling at 61–75.5° C. under 13 mms. mercury gauge.

Small quantities of the amine are also obtained directly in the working up of the original reaction product.

*Example 2*

A mixture of 600 parts by weight of isononylenes, 500 parts by weight of acetic anhydride and 70 parts by weight of zinc chloride is heated with stirring for 4 hours at 70–80° C. Working up yields 300 parts by weight of an oil possessing an ethereal smell and boiling at 90–100° C. under a pressure of 12 mms. mercury gauge.

Elementary analysis of the product gave the following values:

$C = 78.6\%$
$H = 12.0\%$ while for a compound of the composition $C_{11}H_{20}O$ the following values were calculated:

$C = 78.6\%$
$H = 11.9\%$

Accordingly the product is a mixture of isomeric nonenyl methyl ketones.

336 parts by weight of these isononenyl methyl ketones and 360 parts by weight of formamide are heated with stirring for about 25 hours to 180–185° C. Ammonia and carbon dioxide are evolved. On working up 280 parts by weight of a mixture of the isomeric formyl undecenyl amines boiling at 150–170° C. under 10.5 mms. mercury gauge are obtained.

Together therewith are produced 15.6 parts by weight of higher boiling amines together with small quantities of isoundecenyl amines.

On saponification of the formyl undecenyl amines with diluted sulfuric acid the main quantity of the isoundecenyl amines is obtained, forming a colorless liquid boiling from 111–144° C. at 13 mms. mercury gauge.

*Example 3*

A mixture of 1500 parts by weight of a fraction of isomeric isododecylenes boiling from 180–208° C., 1120 parts by weight of acetic anhydride and 150 parts by weight of zinc chloride is heated for 5 hours at 100° C. Working up yields 760 parts by weight of isomeric dodecenyl methyl ketones as a colorless oil with an agreeable odor, boiling at 110–140° C. under a pressure of 10 mms. mercury gauge.

420 parts by weight of these isomeric isododecenyl methyl ketones and 360 parts by weight of formamide are heated for about 28 hours with stirring to 180–185° C. Ammonia and carbon dioxide are evolved. On working up by distillation 353 parts by weight are obtained of isomeric formyl isotetradecenyl amines, which boil from 160–185° C. under 2 mms. mercury gauge.

Together therewith are produced 46 parts by weight of higher boiling amines.

By saponification of the formyl isotetradecenyl amines with concentrated hydrochloric acid at 110° C. the corresponding isotetradecenyl amines are obtained which are also obtained directly as secondary products in small quantity in the condensation of formamide with isododecenyl methyl ketone. The mixture of the isotetradecenyl amines forming a colorless liquid boils at 122–153° C. under 19 mms. mercury gauge.

I claim:

1. Process which comprises heating a material selected from the group consisting of an $\alpha,\beta$-unsaturated acyclic ketone and an $\alpha,\beta$-unsaturated alicyclic ketone containing an open chain of more than 8 carbon atoms in the presence of formamide at a temperature range from 100° C. to below that of the decomposition point, and decomposing the formyl compound produced by means of an inorganic acid.

2. Process which comprises heating a material selected from the group consisting of an $\alpha,\beta$-unsaturated acyclic ketone and an $\alpha,\beta$-unsaturated alicyclic ketone containing a chain of more than 8 carbon atoms in the presence of formamide at a temperature range from 100° C. to below that of decomposition and decomposing the formyl compound produced by means of an inorganic acid.

3. Process which comprises heating a material selected from the group consisting of an $\alpha,\beta$-unsaturated acyclic ketone and an $\alpha,\beta$-unsaturated alicyclic ketone containing a chain of more than 8 carbon atoms in the presence of formamide at a temperature from about 150° to about 200° C. and decomposing the formyl compound by means of an inorganic acid.

4. Process which comprises heating a material selected from the group consisting of an $\alpha,\beta$-unsaturated acyclic ketone and an $\alpha,\beta$-unsaturated alicyclic ketone containing an open chain of more than 8 carbon atoms in the presence of formamide at a temperature from about 150° to about 200° C. and decomposing the formyl compound by means of an inorganic acid.

5. Process which comprises heating diisobutenyl methyl ketone in the presence of formamide at a temperature of 185° C. and decomposing the formyl isodecenyl amine formed with hydrochloric acid.

6. Process which comprises heating isononenyl methyl ketone in the presence of formamide at a temperature from 180°–185° C. and decomposing the formyl isoundecenyl amine formed with diluted sulfuric acid.

7. Process which comprises heating isododecenyl methyl ketone in the presence of formamide at a temperature from 180°–185° C. and decomposing the formyl isotetradecenyl amine formed with hydrochloric acid.

8. Material selected from the group consisting of α,β-unsaturated acyclic amines and α,β-unsaturated alicyclic amines with a chain of more than 8 carbon atoms.

9. Material selected from the group consisting of α,β-unsaturated acyclic amines and α,β-unsaturated alicyclic amines with an open chain of more than 8 carbon atoms.

10. Isodecenyl amine forming a colorless liquid boiling from 61°–75.5° C. under 13 mms. mercury gauge.

11. Isoundecenyl amine forming a colorless liquid boiling from 111°–144° C. under 13 mms. mercury gauge.

12. Isotetradecenyl amine forming a colorless liquid boiling from 122° to 153° C. under 19 mms. mercury gauge.

DANIEL KÄSTNER.